(12) United States Patent
Sankar et al.

(10) Patent No.: US 9,705,800 B2
(45) Date of Patent: Jul. 11, 2017

(54) LOAD DISTRIBUTION IN DATA NETWORKS

(71) Applicant: A10 NETWORKS, INC., San Jose, CA (US)

(72) Inventors: Swaminathan Sankar, San Jose, CA (US); Hasnain Karampurwala, Santa Clara, CA (US); Rahul Gupta, Fremont, CA (US); Gurudeep Kamat, San Jose, CA (US); Rishi Sampat, Santa Clara, CA (US); Rajkumar Jalan, Saratoga, CA (US)

(73) Assignee: A10 NETWORKS, INC., San Jose, CA (US)

( * ) Notice: Subject to any disclaimer, the term of this patent is extended or adjusted under 35 U.S.C. 154(b) by 550 days.

(21) Appl. No.: 14/029,656

(22) Filed: Sep. 17, 2013

(65) Prior Publication Data

US 2014/0089500 A1    Mar. 27, 2014

Related U.S. Application Data

(60) Provisional application No. 61/705,618, filed on Sep. 25, 2012.

(51) Int. Cl.
*G06F 15/173*    (2006.01)
*H04L 12/803*    (2013.01)
*H04L 29/08*    (2006.01)

(52) U.S. Cl.
CPC .......... *H04L 47/125* (2013.01); *H04L 67/101* (2013.01); *H04L 67/1012* (2013.01); *H04L 67/1025* (2013.01); *H04L 67/1031* (2013.01)

(58) Field of Classification Search
CPC ............... H04L 47/125; H04L 63/0227; H04L 41/5003; H04L 41/5019; H04L 47/2408; H04L 47/2425
(Continued)

(56) References Cited

U.S. PATENT DOCUMENTS

| 5,218,602 A | 6/1993 | Grant et al. |
| 5,774,660 A | 6/1998 | Brendel et al. |

(Continued)

FOREIGN PATENT DOCUMENTS

| CN | 1372662 A | 10/2002 |
| CN | 1449618   | 10/2003 |

(Continued)

OTHER PUBLICATIONS

Spatscheck et al., "Optimizing TCP Forwarder Performance", IEEE/ACM Transactions on Networking, vol. 8, No. 2, Apr. 2000.
(Continued)

*Primary Examiner* — Kristie Shingles

(57) ABSTRACT

Provided are methods and systems for load distribution in a data network. A method for load distribution in the data network may comprise retrieving network data associated with the data network and service node data associated with one or more service nodes. The method may further comprise analyzing the retrieved network data and service node data. Based on the analysis, a service policy may be generated. Upon receiving one or more service requests, the one or more service requests may be distributed among the service nodes according to the service policy.

36 Claims, 5 Drawing Sheets

(58) Field of Classification Search
USPC .......................................................... 709/220
See application file for complete search history.

(56) References Cited

U.S. PATENT DOCUMENTS

| | | | |
|---|---|---|---|
| 5,935,207 A | 8/1999 | Logue et al. | |
| 5,958,053 A | 9/1999 | Denker | |
| 5,995,981 A | 11/1999 | Wikstrom | |
| 6,003,069 A | 12/1999 | Cavill | |
| 6,047,268 A | 4/2000 | Bartoli et al. | |
| 6,131,163 A | 10/2000 | Wiegel | |
| 6,219,706 B1 | 4/2001 | Fan et al. | |
| 6,259,705 B1 | 7/2001 | Takahashi et al. | |
| 6,321,338 B1 | 11/2001 | Porras et al. | |
| 6,374,300 B2 | 4/2002 | Masters | |
| 6,459,682 B1* | 10/2002 | Ellesson | H04L 12/5695 370/235 |
| 6,587,866 B1 | 7/2003 | Modi et al. | |
| 6,748,414 B1 | 6/2004 | Bournas | |
| 6,772,334 B1 | 8/2004 | Glawitsch | |
| 6,779,017 B1 | 8/2004 | Lamberton et al. | |
| 6,779,033 B1 | 8/2004 | Watson et al. | |
| 6,952,728 B1 | 10/2005 | Alles et al. | |
| 7,010,605 B1 | 3/2006 | Dharmarajan | |
| 7,013,482 B1 | 3/2006 | Krumel | |
| 7,058,718 B2 | 6/2006 | Fontes et al. | |
| 7,069,438 B2 | 6/2006 | Balabine et al. | |
| 7,076,555 B1 | 7/2006 | Orman et al. | |
| 7,143,087 B2 | 11/2006 | Fairweather | |
| 7,181,524 B1 | 2/2007 | Lele | |
| 7,218,722 B1 | 5/2007 | Turner et al. | |
| 7,228,359 B1 | 6/2007 | Monteiro | |
| 7,234,161 B1 | 6/2007 | Maufer et al. | |
| 7,236,457 B2 | 6/2007 | Joe | |
| 7,254,133 B2 | 8/2007 | Govindarajan et al. | |
| 7,269,850 B2 | 9/2007 | Govindarajan et al. | |
| 7,277,963 B2 | 10/2007 | Dolson et al. | |
| 7,301,899 B2 | 11/2007 | Goldstone | |
| 7,308,499 B2 | 12/2007 | Chavez | |
| 7,310,686 B2 | 12/2007 | Uysal | |
| 7,328,267 B1 | 2/2008 | Bashyam et al. | |
| 7,334,232 B2 | 2/2008 | Jacobs et al. | |
| 7,337,241 B2 | 2/2008 | Boucher et al. | |
| 7,343,399 B2 | 3/2008 | Hayball et al. | |
| 7,349,970 B2 | 3/2008 | Clement et al. | |
| 7,370,353 B2 | 5/2008 | Yang | |
| 7,391,725 B2 | 6/2008 | Huitema et al. | |
| 7,398,317 B2 | 7/2008 | Chen et al. | |
| 7,423,977 B1 | 9/2008 | Joshi | |
| 7,430,755 B1 | 9/2008 | Hughes et al. | |
| 7,463,648 B1 | 12/2008 | Eppstein et al. | |
| 7,467,202 B2 | 12/2008 | Savchuk | |
| 7,472,190 B2 | 12/2008 | Robinson | |
| 7,492,766 B2 | 2/2009 | Cabeca et al. | |
| 7,506,360 B1 | 3/2009 | Wilkinson et al. | |
| 7,509,369 B1 | 3/2009 | Tormasov | |
| 7,512,980 B2 | 3/2009 | Copeland et al. | |
| 7,533,409 B2 | 5/2009 | Keane et al. | |
| 7,552,323 B2 | 6/2009 | Shay | |
| 7,584,262 B1 | 9/2009 | Wang et al. | |
| 7,584,301 B1 | 9/2009 | Joshi | |
| 7,590,736 B2 | 9/2009 | Hydrie et al. | |
| 7,613,193 B2 | 11/2009 | Swami et al. | |
| 7,613,822 B2 | 11/2009 | Joy et al. | |
| 7,673,072 B2 | 3/2010 | Boucher et al. | |
| 7,675,854 B2 | 3/2010 | Chen et al. | |
| 7,703,102 B1 | 4/2010 | Eppstein et al. | |
| 7,707,295 B1 | 4/2010 | Szeto et al. | |
| 7,711,790 B1 | 5/2010 | Barrett et al. | |
| 7,739,395 B1 | 6/2010 | Parlamas et al. | |
| 7,747,748 B2 | 6/2010 | Allen | |
| 7,751,409 B1 | 7/2010 | Carolan | |
| 7,765,328 B2* | 7/2010 | Bryers | H04L 29/06 709/220 |
| 7,792,113 B1 | 9/2010 | Foschiano et al. | |
| 7,808,994 B1 | 10/2010 | Vinokour et al. | |
| 7,826,487 B1 | 11/2010 | Mukerji et al. | |
| 7,881,215 B1 | 2/2011 | Daigle et al. | |
| 7,948,952 B2 | 5/2011 | Hurtta et al. | |
| 7,970,934 B1 | 6/2011 | Patel | |
| 7,983,258 B1 | 7/2011 | Ruben et al. | |
| 7,990,847 B1 | 8/2011 | Leroy et al. | |
| 7,991,859 B1 | 8/2011 | Miller et al. | |
| 8,019,870 B1 | 9/2011 | Eppstein et al. | |
| 8,032,634 B1 | 10/2011 | Eppstein et al. | |
| 8,090,866 B1 | 1/2012 | Bashyam et al. | |
| 8,122,116 B2 | 2/2012 | Matsunaga et al. | |
| 8,179,809 B1 | 5/2012 | Eppstein et al. | |
| 8,185,651 B2 | 5/2012 | Moran et al. | |
| 8,191,106 B2 | 5/2012 | Choyi et al. | |
| 8,224,971 B1 | 7/2012 | Miller et al. | |
| 8,266,235 B2 | 9/2012 | Jalan et al. | |
| 8,296,434 B1 | 10/2012 | Miller et al. | |
| 8,312,507 B2 | 11/2012 | Chen et al. | |
| 8,379,515 B1 | 2/2013 | Mukerji | |
| 8,499,093 B2 | 7/2013 | Grosser et al. | |
| 8,539,075 B2 | 9/2013 | Bali et al. | |
| 8,554,929 B1 | 10/2013 | Szeto et al. | |
| 8,560,693 B1 | 10/2013 | Wang et al. | |
| 8,584,199 B1 | 11/2013 | Chen et al. | |
| 8,595,791 B1 | 11/2013 | Chen et al. | |
| RE44,701 E | 1/2014 | Chen et al. | |
| 8,675,488 B1 | 3/2014 | Sidebottom et al. | |
| 8,681,610 B1 | 3/2014 | Mukerji | |
| 8,750,164 B2* | 6/2014 | Casado | H04L 12/4633 370/254 |
| 8,782,221 B2 | 7/2014 | Han | |
| 8,813,180 B1 | 8/2014 | Chen et al. | |
| 8,826,372 B1 | 9/2014 | Chen et al. | |
| 8,879,427 B2 | 11/2014 | Krumel | |
| 8,885,463 B1 | 11/2014 | Medved et al. | |
| 8,897,154 B2 | 11/2014 | Jalan et al. | |
| 8,965,957 B2 | 2/2015 | Barros | |
| 8,977,749 B1 | 3/2015 | Han | |
| 8,990,262 B2 | 3/2015 | Chen et al. | |
| 9,094,364 B2 | 7/2015 | Jalan et al. | |
| 9,106,561 B2 | 8/2015 | Jalan et al. | |
| 9,154,577 B2 | 10/2015 | Jalan et al. | |
| 9,154,584 B1 | 10/2015 | Han | |
| 9,215,275 B2 | 12/2015 | Kannan et al. | |
| 9,219,751 B1 | 12/2015 | Chen et al. | |
| 9,253,152 B1 | 2/2016 | Chen et al. | |
| 9,270,705 B1 | 2/2016 | Chen et al. | |
| 9,270,774 B2 | 2/2016 | Jalan et al. | |
| 9,338,225 B2 | 5/2016 | Jalan et al. | |
| 9,350,744 B2 | 5/2016 | Chen et al. | |
| 9,356,910 B2 | 5/2016 | Chen et al. | |
| 9,386,088 B2 | 7/2016 | Zheng et al. | |
| 9,609,052 B2 | 3/2017 | Jalan et al. | |
| 2001/0049741 A1 | 12/2001 | Skene et al. | |
| 2002/0032777 A1 | 3/2002 | Kawata et al. | |
| 2002/0078164 A1 | 6/2002 | Reinschmidt | |
| 2002/0091844 A1 | 7/2002 | Craft et al. | |
| 2002/0103916 A1 | 8/2002 | Chen et al. | |
| 2002/0133491 A1 | 9/2002 | Sim et al. | |
| 2002/0138618 A1 | 9/2002 | Szabo | |
| 2002/0143991 A1 | 10/2002 | Chow et al. | |
| 2002/0178259 A1 | 11/2002 | Doyle et al. | |
| 2002/0191575 A1 | 12/2002 | Kalavade et al. | |
| 2002/0194335 A1 | 12/2002 | Maynard | |
| 2002/0194350 A1 | 12/2002 | Lu et al. | |
| 2003/0009591 A1 | 1/2003 | Hayball et al. | |
| 2003/0014544 A1 | 1/2003 | Pettey | |
| 2003/0023711 A1 | 1/2003 | Parmar et al. | |
| 2003/0023873 A1 | 1/2003 | Ben-Itzhak | |
| 2003/0035409 A1 | 2/2003 | Wang et al. | |
| 2003/0035420 A1 | 2/2003 | Niu | |
| 2003/0065762 A1 | 4/2003 | Stolorz et al. | |
| 2003/0091028 A1 | 5/2003 | Chang et al. | |
| 2003/0131245 A1 | 7/2003 | Linderman | |
| 2003/0135625 A1 | 7/2003 | Fontes et al. | |
| 2003/0195962 A1 | 10/2003 | Kikuchi et al. | |
| 2004/0062246 A1 | 4/2004 | Boucher et al. | |
| 2004/0073703 A1 | 4/2004 | Boucher et al. | |

(56) References Cited

U.S. PATENT DOCUMENTS

| | | |
|---|---|---|
| 2004/0078419 A1 | 4/2004 | Ferrari et al. |
| 2004/0078480 A1 | 4/2004 | Boucher et al. |
| 2004/0111516 A1 | 6/2004 | Cain |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1 | 10/2004 | Phillips et al. |
| 2004/0213158 A1 | 10/2004 | Collett et al. |
| 2004/0268358 A1 | 12/2004 | Darling et al. |
| 2005/0005207 A1 | 1/2005 | Herneque |
| 2005/0009520 A1 | 1/2005 | Herrero et al. |
| 2005/0021848 A1 | 1/2005 | Jorgenson |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0044270 A1 | 2/2005 | Grove et al. |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0125276 A1 | 6/2005 | Rusu |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0259586 A1 | 11/2005 | Hafid et al. |
| 2005/0289231 A1 | 12/2005 | Harada et al. |
| 2006/0023721 A1 | 2/2006 | Miyake et al. |
| 2006/0036610 A1 | 2/2006 | Wang |
| 2006/0036733 A1 | 2/2006 | Fujimoto et al. |
| 2006/0064478 A1 | 3/2006 | Sirkin |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0209789 A1 | 9/2006 | Gupta et al. |
| 2006/0230129 A1 | 10/2006 | Swami et al. |
| 2006/0233100 A1 | 10/2006 | Luft et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0156919 A1 | 7/2007 | Potti et al. |
| 2007/0165622 A1 | 7/2007 | O'Rourke et al. |
| 2007/0185998 A1 | 8/2007 | Touitou et al. |
| 2007/0195792 A1 | 8/2007 | Chen et al. |
| 2007/0230337 A1 | 10/2007 | Igarashi et al. |
| 2007/0245090 A1 | 10/2007 | King et al. |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0031263 A1 | 2/2008 | Ervin et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0134332 A1 | 6/2008 | Keohane et al. |
| 2008/0162679 A1 | 7/2008 | Maher et al. |
| 2008/0228781 A1 | 9/2008 | Chen et al. |
| 2008/0250099 A1 | 10/2008 | Shen et al. |
| 2008/0263209 A1 | 10/2008 | Pisharody et al. |
| 2008/0271130 A1 | 10/2008 | Ramamoorthy |
| 2008/0282254 A1 | 11/2008 | Blander et al. |
| 2008/0291911 A1 | 11/2008 | Lee et al. |
| 2009/0049198 A1 | 2/2009 | Blinn et al. |
| 2009/0070470 A1 | 3/2009 | Bauman et al. |
| 2009/0077651 A1 | 3/2009 | Poeluev |
| 2009/0092124 A1 | 4/2009 | Singhal et al. |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0213858 A1 | 8/2009 | Dolganow et al. |
| 2009/0222583 A1 | 9/2009 | Josefsberg et al. |
| 2009/0227228 A1 | 9/2009 | Hu et al. |
| 2009/0228547 A1 | 9/2009 | Miyaoka et al. |
| 2009/0262741 A1 | 10/2009 | Jungck et al. |
| 2009/0271472 A1 | 10/2009 | Scheifler et al. |
| 2009/0313379 A1 | 12/2009 | Rydnell et al. |
| 2010/0004004 A1 | 1/2010 | Browne-Swinburne et al. |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0098417 A1 | 4/2010 | Tse-Au |
| 2010/0106833 A1 | 4/2010 | Banerjee et al. |
| 2010/0106854 A1 | 4/2010 | Kim et al. |
| 2010/0128606 A1 | 5/2010 | Patel et al. |
| 2010/0162378 A1 | 6/2010 | Jayawardena et al. |
| 2010/0210265 A1 | 8/2010 | Borzsei et al. |
| 2010/0211669 A1 | 8/2010 | Dalgas et al. |
| 2010/0217793 A1 | 8/2010 | Preiss |
| 2010/0217819 A1 | 8/2010 | Chen et al. |
| 2010/0223630 A1 | 9/2010 | Degenkolb et al. |
| 2010/0228819 A1 | 9/2010 | Wei |
| 2010/0228878 A1 | 9/2010 | Xu et al. |
| 2010/0235507 A1 | 9/2010 | Szeto et al. |
| 2010/0235522 A1 | 9/2010 | Chen et al. |
| 2010/0235880 A1 | 9/2010 | Chen et al. |
| 2010/0238828 A1 | 9/2010 | Russell |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0019550 A1* | 1/2011 | Bryers ............... H04L 29/06 370/235 |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0060840 A1 | 3/2011 | Susai et al. |
| 2011/0093522 A1 | 4/2011 | Chen et al. |
| 2011/0099403 A1 | 4/2011 | Miyata et al. |
| 2011/0110294 A1 | 5/2011 | Valluri et al. |
| 2011/0145324 A1 | 6/2011 | Reinart et al. |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0276695 A1 | 11/2011 | Maldaner |
| 2011/0276982 A1 | 11/2011 | Nakayama et al. |
| 2011/0289496 A1 | 11/2011 | Steer |
| 2011/0292939 A1 | 12/2011 | Subramaian et al. |

(56) References Cited

U.S. PATENT DOCUMENTS

| | | |
|---|---|---|
| 2011/0302256 A1 | 12/2011 | Sureshchandra et al. |
| 2011/0307541 A1 | 12/2011 | Walsh et al. |
| 2012/0008495 A1 | 1/2012 | Shen et al. |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0066371 A1 | 3/2012 | Patel et al. |
| 2012/0084419 A1 | 4/2012 | Kannan et al. |
| 2012/0084460 A1 | 4/2012 | McGinnity et al. |
| 2012/0106355 A1 | 5/2012 | Ludwig |
| 2012/0117571 A1 | 5/2012 | Davis et al. |
| 2012/0144014 A1 | 6/2012 | Natham et al. |
| 2012/0144015 A1 | 6/2012 | Jalan et al. |
| 2012/0151353 A1 | 6/2012 | Joanny |
| 2012/0170548 A1 | 7/2012 | Rajagopalan et al. |
| 2012/0173759 A1 | 7/2012 | Agarwal et al. |
| 2012/0179770 A1 | 7/2012 | Jalan et al. |
| 2012/0191839 A1 | 7/2012 | Maynard |
| 2012/0239792 A1 | 9/2012 | Banerjee et al. |
| 2012/0240185 A1 | 9/2012 | Kapoor et al. |
| 2012/0290727 A1 | 11/2012 | Tivig |
| 2012/0297046 A1 | 11/2012 | Raja et al. |
| 2012/0311116 A1 | 12/2012 | Jalan et al. |
| 2013/0046876 A1 | 2/2013 | Narayana et al. |
| 2013/0058335 A1* | 3/2013 | Koponen ............. H04L 49/25 370/390 |
| 2013/0074177 A1 | 3/2013 | Varadhan et al. |
| 2013/0083725 A1 | 4/2013 | Mallya et al. |
| 2013/0100958 A1 | 4/2013 | Jalan et al. |
| 2013/0103817 A1 | 4/2013 | Koponen et al. |
| 2013/0124713 A1 | 5/2013 | Feinberg et al. |
| 2013/0136139 A1 | 5/2013 | Zheng et al. |
| 2013/0148500 A1 | 6/2013 | Sonoda et al. |
| 2013/0166762 A1 | 6/2013 | Jalan et al. |
| 2013/0173795 A1 | 7/2013 | McPherson |
| 2013/0176854 A1 | 7/2013 | Chisu et al. |
| 2013/0191486 A1 | 7/2013 | Someya et al. |
| 2013/0198385 A1 | 8/2013 | Han et al. |
| 2013/0250765 A1 | 9/2013 | Ehsan et al. |
| 2013/0250770 A1 | 9/2013 | Zou et al. |
| 2013/0258846 A1 | 10/2013 | Damola |
| 2013/0268646 A1 | 10/2013 | Doron et al. |
| 2013/0282791 A1 | 10/2013 | Kruglick |
| 2013/0336159 A1 | 12/2013 | Previdi et al. |
| 2014/0012972 A1 | 1/2014 | Han |
| 2014/0164617 A1 | 6/2014 | Jalan et al. |
| 2014/0169168 A1 | 6/2014 | Jalan et al. |
| 2014/0207845 A1 | 7/2014 | Han et al. |
| 2014/0226658 A1 | 8/2014 | Kakadia et al. |
| 2014/0235249 A1 | 8/2014 | Jeong et al. |
| 2014/0248914 A1 | 9/2014 | Aoyagi et al. |
| 2014/0258465 A1 | 9/2014 | Li |
| 2014/0258536 A1 | 9/2014 | Chiong |
| 2014/0269728 A1 | 9/2014 | Jalan et al. |
| 2014/0286313 A1 | 9/2014 | Fu et al. |
| 2014/0298091 A1 | 10/2014 | Carlen et al. |
| 2014/0325649 A1 | 10/2014 | Zhang |
| 2014/0330982 A1 | 11/2014 | Jalan et al. |
| 2014/0334485 A1 | 11/2014 | Jain et al. |
| 2014/0359052 A1 | 12/2014 | Joachimpillai et al. |
| 2015/0039671 A1 | 2/2015 | Jalan et al. |
| 2015/0098333 A1 | 4/2015 | Lin et al. |
| 2015/0156223 A1 | 6/2015 | Xu et al. |
| 2015/0215436 A1 | 7/2015 | Kancherla |
| 2015/0237173 A1 | 8/2015 | Virkki et al. |
| 2015/0281087 A1 | 10/2015 | Jalan et al. |
| 2015/0281104 A1 | 10/2015 | Golshan et al. |
| 2015/0296058 A1 | 10/2015 | Jalan et al. |
| 2015/0312268 A1 | 10/2015 | Ray |
| 2015/0333988 A1 | 11/2015 | Jalan et al. |
| 2015/0350048 A1 | 12/2015 | Sampat et al. |
| 2015/0350379 A1 | 12/2015 | Jalan et al. |
| 2016/0014052 A1 | 1/2016 | Han |
| 2016/0036778 A1 | 2/2016 | Chen et al. |
| 2016/0042014 A1 | 2/2016 | Jalan et al. |
| 2016/0043901 A1 | 2/2016 | Sankar et al. |
| 2016/0044095 A1 | 2/2016 | Sankar et al. |
| 2016/0050233 A1 | 2/2016 | Chen et al. |
| 2016/0088074 A1 | 3/2016 | Kannan et al. |
| 2016/0094470 A1 | 3/2016 | Skog |
| 2016/0105395 A1 | 4/2016 | Chen et al. |
| 2016/0105446 A1 | 4/2016 | Chen et al. |
| 2016/0119382 A1 | 4/2016 | Chen et al. |
| 2016/0139910 A1 | 5/2016 | Ramanathan et al. |
| 2016/0156708 A1 | 6/2016 | Jalan et al. |
| 2016/0164792 A1 | 6/2016 | Oran |
| 2016/0173579 A1 | 6/2016 | Jalan et al. |

FOREIGN PATENT DOCUMENTS

| | | |
|---|---|---|
| CN | 1529460 | 9/2004 |
| CN | 1575582 | 2/2005 |
| CN | 1714545 A | 12/2005 |
| CN | 1725702 | 1/2006 |
| CN | 101004740 A | 7/2007 |
| CN | 101094225 | 12/2007 |
| CN | 101163336 A | 4/2008 |
| CN | 101169785 A | 4/2008 |
| CN | 101189598 | 5/2008 |
| CN | 101193089 A | 6/2008 |
| CN | 101247349 A | 8/2008 |
| CN | 101261644 A | 9/2008 |
| CN | 102143075 A | 8/2011 |
| CN | 102546590 | 7/2012 |
| CN | 102571742 | 7/2012 |
| CN | 102577252 | 7/2012 |
| CN | 102918801 | 2/2013 |
| CN | 103533018 A | 1/2014 |
| CN | 103944954 | 7/2014 |
| CN | 104040990 | 9/2014 |
| CN | 104067569 | 9/2014 |
| CN | 104106241 | 10/2014 |
| CN | 104137491 | 11/2014 |
| CN | 104796396 A | 7/2015 |
| CN | 102577252 B | 3/2016 |
| CN | 102918801 B | 5/2016 |
| CN | 102571742 B | 7/2016 |
| CN | 104067569 B | 2/2017 |
| EP | 1209876 | 5/2002 |
| EP | 1770915 | 4/2007 |
| EP | 1885096 | 2/2008 |
| EP | 02296313 | 3/2011 |
| EP | 2577910 | 4/2013 |
| EP | 2622795 | 8/2013 |
| EP | 2647174 | 10/2013 |
| EP | 2760170 | 7/2014 |
| EP | 2772026 | 9/2014 |
| EP | 2901308 A2 | 8/2015 |
| EP | 2760170 B1 | 12/2015 |
| EP | 2772026 B1 | 2/2017 |
| HK | 1182560 | 11/2013 |
| HK | 1183569 A | 12/2013 |
| HK | 1183996 A | 1/2014 |
| HK | 1189438 | 6/2014 |
| HK | 1198565 A1 | 5/2015 |
| HK | 1198848 A1 | 6/2015 |
| HK | 1199153 A1 | 6/2015 |
| HK | 1199779 A1 | 7/2015 |
| HK | 1200617 A1 | 8/2015 |
| IN | 261CHE2014 A | 7/2016 |
| IN | 1668CHENP2015 A | 7/2016 |
| JP | H09-097233 | 4/1997 |
| JP | 1999096128 | 4/1999 |
| JP | H11-338836 | 10/1999 |
| JP | 2000276432 A | 10/2000 |
| JP | 2000307634 A | 11/2000 |
| JP | 2001051859 A | 2/2001 |
| JP | 2001298449 A | 10/2001 |
| JP | 2002091936 A | 3/2002 |
| JP | 2003141068 A | 5/2003 |
| JP | 2003186776 A | 7/2003 |
| JP | 2005141441 A | 6/2005 |
| JP | 2006332825 A | 12/2006 |
| JP | 2008040718 A | 2/2008 |

(56) References Cited

FOREIGN PATENT DOCUMENTS

| | | | |
|---|---|---|---|
| JP | 2009500731 A | | 1/2009 |
| JP | 2013528330 | | 5/2011 |
| JP | 2014504484 A | | 2/2014 |
| JP | 2014-143686 | | 8/2014 |
| JP | 2015507380 A | | 3/2015 |
| JP | 5855663 | B2 | 12/2015 |
| JP | 5913609 | B2 | 4/2016 |
| JP | 5946189 | B2 | 6/2016 |
| JP | 5963766 | B2 | 8/2016 |
| KR | 1020080008340 A | | 1/2008 |
| KR | 10-0830413 | | 5/2008 |
| KR | 1020120117461 | | 8/2013 |
| KR | 101576585 | B1 | 12/2015 |
| KR | 101632187 | | 6/2016 |
| WO | 01/13228 | | 2/2001 |
| WO | WO0114990 | | 3/2001 |
| WO | WO0145349 | | 6/2001 |
| WO | WO03103237 | | 12/2003 |
| WO | WO2004084085 | A1 | 9/2004 |
| WO | WO2006098033 | A1 | 9/2006 |
| WO | 2008053954 | | 5/2008 |
| WO | WO2008078593 | A1 | 7/2008 |
| WO | 2011049770 | | 4/2011 |
| WO | WO2011079381 | A1 | 7/2011 |
| WO | 2011149796 | | 12/2011 |
| WO | 2012050747 | | 4/2012 |
| WO | 2012075237 | | 6/2012 |
| WO | WO2012083264 | A2 | 6/2012 |
| WO | WO2012097015 | A2 | 7/2012 |
| WO | 2013070391 | | 5/2013 |
| WO | 2013081952 | | 6/2013 |
| WO | 2013096019 | | 6/2013 |
| WO | 2013112492 | | 8/2013 |
| WO | WO2013189024 | A1 | 12/2013 |
| WO | WO2014031046 | A1 | 2/2014 |
| WO | WO2014052099 | | 4/2014 |
| WO | 2014088741 | | 6/2014 |
| WO | 2014093829 | | 6/2014 |
| WO | 2014138483 | | 9/2014 |
| WO | 2014144837 | | 9/2014 |
| WO | WO 2014179753 | | 11/2014 |
| WO | WO2015153020 | A1 | 10/2015 |

OTHER PUBLICATIONS

Kjaer et al. "Resource allocation and disturbance rejection in web servers using SLAs and virtualized servers", IEEE Transactions on Network and Service Management, IEEE, US, vol. 6, No. 4, Dec. 1, 2009.

Sharifian et al. "An approximation-based load-balancing algorithm with admission control for cluster web servers with dynamic workloads", The Journal of Supercomputing, Kluwer Academic Publishers, BO, vol. 53, No. 3, Jul. 3, 2009.

IN Journal38/2015, Sep. 25, 2015, Jalan et al.

Cardellini et al., "Dynamic Load Balancing on Web-server Systems", IEEE Internet Computing, vol. 3, No. 3, pp. 28-39, May-Jun. 1999.

Goldszmidt et al. NetDispatcher: A TCP Connection Router, IBM Research Report RC 20853, May 19, 1997.

Noguchi, "Realizing the Highest Level Layer 7" Switch" = Totally Managing Network Resources, Applications, and Users =, Computer & Network LAN, Jan. 1, 2000, vol. 18, No. 1, p. 109-112.

Takahashi, "The Fundamentals of the Windows Network: Understanding the Mystery of the Windows Network from the Basics", Network Magazine, Jul. 1, 2006, vol. 11, No. 7, p. 32-35.

Ohnuma, "AppSwitch: 7th Layer Switch Provided with Full Setup and Report Tools", Interop Magazine, Jun. 1, 2000, vol. 10, No. 6, p. 148-150.

Koike et al., "Transport Middleware for Network-Based Control," IEICE Technical Report, Jun. 22, 2000, vol. 100, No. 53, pp. 13-18.

Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.

Abe et al., "Adaptive Split Connection Schemes in Advanced Relay Nodes," IEICE Technical Report, Feb. 22, 2010, vol. 109, No. 438, pp. 25-30.

Gite, Vivek, "Linux Tune Network Stack (Buffers Size) to Increase Networking Performance," nixCraft [online], Jul. 8, 2009 [retrieved on Apr. 13, 2016], Retreived from the Internt: <URL:http://www.cyberciti.biz/faq/linux-tcp-tuning/>.

FreeBSD, "tcp—TCP Protocol," Linux Programmer's Manual [online], Nov. 25, 2007 [retreived on Apr. 13, 2016], Retreived from the Internet: <URL:https://www.freebsd.org/cgi/man.cgi?query=tcp&apropos=0&sektion=7&manpath=SuSE+Linux%2Fi386+11.0&format=asci>.

* cited by examiner

LOAD DISTRIBUTION IN DATA NETWORKS

CROSS-REFERENCE TO RELATED APPLICATIONS

This patent application claims the priority benefit of U.S. provisional patent application No. 61/705,618, filed Sep. 25, 2012, the disclosure of which is incorporated herein by reference.

TECHNICAL FIELD

This disclosure relates generally to data processing, and, more specifically, to load distribution in software driven networks (SDN).

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

In a typical load balancing scenario, a service hosted by a group of servers is front-ended by a load balancer (LB) (also referred to herein as a LB device) which represents this service to clients as a virtual service. Clients needing the service can address their packets to the virtual service using a virtual Internet Protocol (IP) address and a virtual port. For example, www.example.com:80 is a service that is being load balanced and there is a group of servers that host this service. An LB can be configured with a virtual IP (VIP) e.g. 100.100.100.1 and virtual port (VPort) e.g. Port 80, which, in turn, are mapped to the IP addresses and port numbers of the servers handling this service. The Domain Name Service (DNS) server handling this domain can be configured to send packets to the VIP and VPort associated with this LB.

The LB will inspect incoming packets and based on the policies/algorithms will choose a particular server from the group of servers, modify the packet if necessary and forward the packet towards the server. On the way back from the server (optional), the LB will get the packet, modify the packet if necessary and forward the packet back towards the client.

There is often a need to scale up or scale down the LB service. For example, the LB service may need to be scaled up or down based on time of the day e.g. days vs. nights, weekdays vs. weekends. For example, fixed-interval software updates may result in predictable network congestions and, therefore, the LB service may need to be scaled up to handle the flash crowd phenomenon and scaled down subsequently. The popularity of the service may necessitate the need to scale up the service. These situations can be handled within the LB when the performance characteristics of the LB device can handle the scaling adjustments needed.

However, in many cases the performance needs to be increased to beyond what a single load balancing device can handle. Typical approaches for this include physical chassis-based solutions, where cards can be inserted and removed to handle the service requirements. These approaches have many disadvantages which include the need to pre-provision space, power, and price for a chassis for future needs. Additionally, a single chassis can only scale up to the maximum capacity of its cards. To cure this deficiency, one can attempt to stack LB devices and send traffic between the devices as needed. However, this approach may also have disadvantages such as the link between the devices becoming the bottleneck, and increased latencies as packets have to traverse multiple LBs to reach the entity that will eventually handle the requests.

Another existing solution is to add multiple LB devices, create individual VIPs on each device for the same servers in the backend and use the DNS to distribute the load among them. When another LB needs to be added, another entry is added to the DNS database. When an LB needs to be removed, the corresponding entry is removed from the DNS database. However, this approach has the following issues. DNS records are cached and hence addition/removal of LBs may take time before they are effective. This is especially problematic when an LB is removed as data directed to the LB can be lost. The distribution across the LBs is very coarse and not traffic aware e.g. one LB may be overwhelmed while other LBs may be idle, some clients may be heavier users and end up sending requests to the same LB, and so forth. The distribution between LBs may not be LB capacity aware e.g. LB1 may be a much more powerful device than LB2. Thus, the existing solutions to solve this problem all have their disadvantages.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for load distribution in a data network. Specifically, a method for load distribution in a data network may comprise retrieving network data associated with the data network and service node data associated with one or more service nodes. The method may further comprise analyzing the retrieved network data and service node data. Based on the analysis, a service policy may be generated. The generated service policy may be provided to devices associated with the data network. Upon receiving one or more service requests, the one or more service requests may be distributed among the one or more service nodes according to the service policy.

According to another approach of the present disclosure, there is provided a system for load distribution in a data network. The system may comprise a cluster master. The cluster master may be configured to retrieve and analyze network data associated with the data network and service node data associated with one or more service nodes. Based on the analysis, the cluster master may generate a service policy and provide the generated service policy to devices associated with the data network. The system may further comprise a traffic classification engine. The traffic classification engine may be configured to receive the service policy from the cluster master. Upon receiving one or more service requests, the traffic classification engine may distribute the service requests among one or more service nodes according to the service policy. Furthermore, the system may comprise the one or more service nodes. The service nodes may be configured to receive the service policy from the cluster master and receive the one or more service requests from the traffic classification engine. The service nodes may process the one or more service requests according to the service policy.

In another approach of the present disclosure, the cluster master may reside within the traffic classification engine layer or the service node layer. Additionally the traffic classification engine may, in turn, reside within the service node layer.

In further example embodiments of the present disclosure, the method steps are stored on a machine-readable medium comprising instructions, which when implemented by one or more processors perform the recited steps. In yet further example embodiments, hardware systems, or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
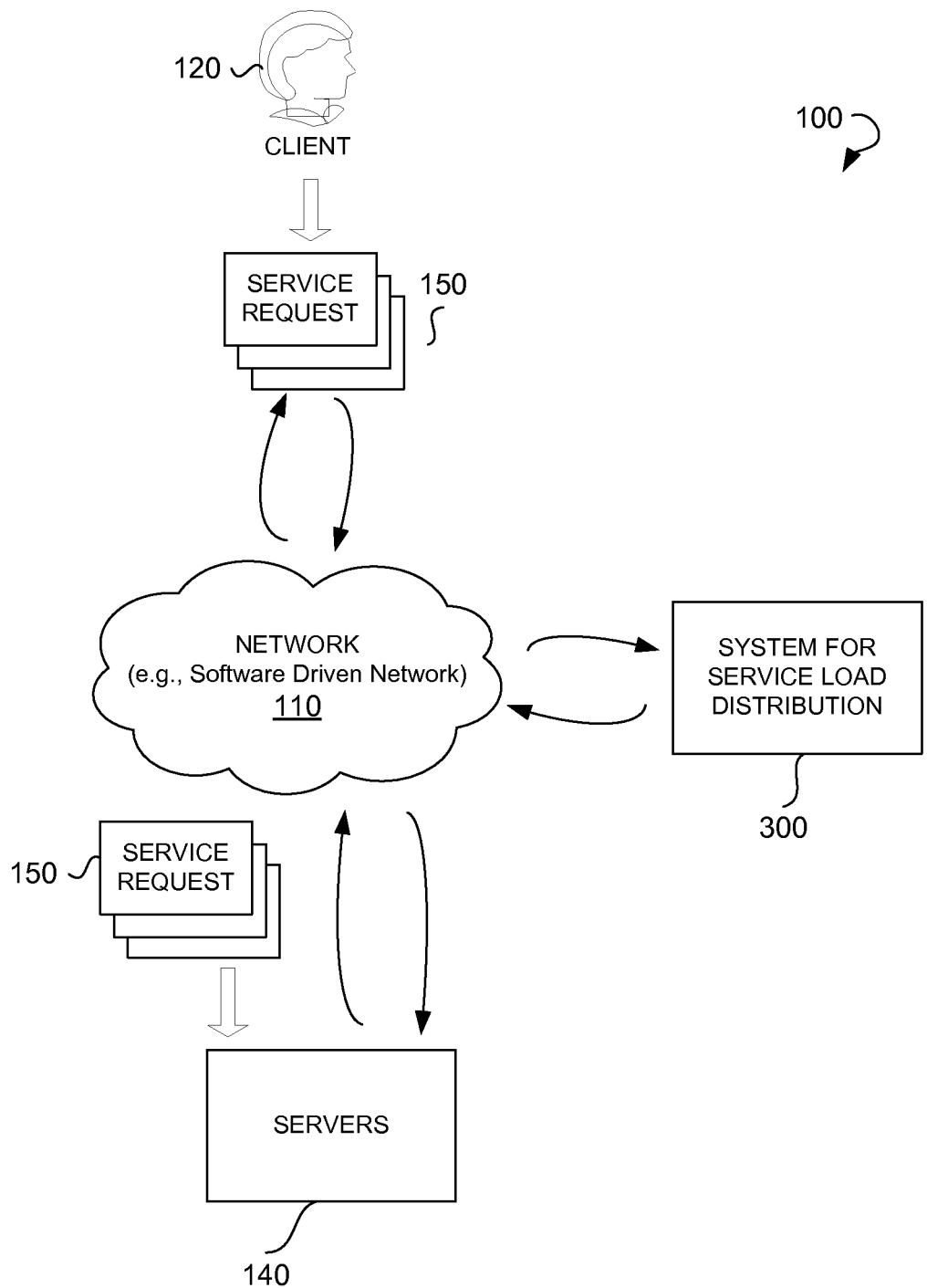
FIG. 1 shows an environment within which a method and a system for service load distribution in a data network can be implemented, according to an example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The present disclosure relates to efficient ways of implementing load balancing by having an LB service and a data network, such as an SDN, work together to deliver packets to multiple LBs. Because the SDN is aware of the requirements of the LB service, it can efficiently distribute traffic to the LBs. This approach allows the same virtual service to be hosted on multiple LBs, without needing any DNS changes. There are minimal to no latency impacts since the packets are delivered directly to the LB that handles them. Fine-grained distribution of flows to the LBs can be achieved based on the LBs capabilities, network capabilities and current loads. This approach also supports scaling up/down of services as needed as well as facilitating management and operation of the load balancing by administrators.

In some example embodiments, a protocol can be running between the LBs and SDN elements that make the SDN and the LB exchange information on how to distribute traffic, dynamically inserting forwarding rules to influence packet path selection on devices that are capable of performing such forwarding. Algorithms controlled by the LBs can be implemented on routers, switches and other devices to influence traffic steering.

To ensure distribution of data flow in a network of heterogeneous switches from multiple vendors, additional technologies can be used. These technologies may utilize a controller to compute paths between sources and destination and program the flows on the network devices between the sources and destination. This property can be leveraged to program flows intelligently to scale out/in the load balancing implementation in the network based on demand, availability of resources, and so forth.

As LBs activate and deactivate based on the requirements, such as for example, load increases or configurations changes, the LBs can update the controller and have the controller make changes to the flows in the network. In an example embodiment, in case there is no appropriate external controller, the LB may itself act as the controller and may directly make changes to the flows in the network. Similarly, the controller can work with the LB to inform the LB of network loads and other inputs, health of devices in the network, and so forth to assist the LBs with making decisions.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, a tablet computer, a laptop computer, and a server), game console, handheld gaming device, cellular phone, smart phone, smart television system, and so forth.

As outlined in the summary, the embodiments of the present disclosure refer to load distribution in an SDN. As referred herein, an SDN is a network that allows managing network services through abstraction of lower level functionality by decoupling a control plane that makes decisions as to where a service request, e.g. traffic from a client to a server, is to be sent from a data plane responsible for forwarding the service request to the selected destination based on the decision of the control plane. The data plane may reside on the network hardware or software devices and the control plane may be executed through the software. Such separation of the planes of the SDN may enable network virtualization, since commands or control rules may be executed by the software. The SDN may be configured to deliver client service requests or host service requests to virtual machines and physical devices, e.g. servers.

The control plane may be configured to ascertain the health and other data associated with the SDN and virtual machines, for example, by real time data network applets. The control plane may leverage the real time data network applets and other means to gauge service responsiveness on the virtual machines, monitor the total connections, central processing unit utilization, and memory as well as network connectivity on the virtual machines and use that information to influence the load distribution decisions and forwarding on the data plane.

Furthermore, the control plane may comprise a service policy engine configured to analyze the collected health data and, based on the analysis, translate the health data into service policies. The service policies may include policies to enhance, i.e. scale out or scale down, the number of virtual machines, traffic classification engines, or backend servers, to remedy or repair failed virtual machines, to secure virtual machines, to introduce new virtual machines, to remove virtual machines, and so forth. Effectively, the service policies may influence load balancing, high availability as well as programming the SDN network. Therefore, based on the service policies, the SDN may scale out or scale down the use of traffic distribution devices through periods or dynamic loads and thereby optimize network resources respectively. The traffic distribution devices may be scaled out or scaled down based, for example, on time of the day. Furthermore, fixed-interval software updates may result in predictable network congestions and the load balancing may need to be scaled out to handle the flash crowd phenomenon and scaled down subsequently. Additionally, the popularity of the service may necessitate the need to scale up the service.

The SDN may comprise a controller enabling programmable control of routing the service requests, such as network traffic, without requiring physical access to network switches. In other words, the controller may be configured to steer the traffic across the network to server pools or virtual machine pools. The service policy engine may communicate with the controller and inject the service policies into the controller. The controller, in turn, may steer traffic across the network devices, such as server or virtual machines, according to the service policies.

In an example embodiment, the service data plane of the SDN may be configured as an application delivery controller (ADC). The control plane may communicate with the ADC by managing a set of service policies mapping service requests to one or more ADCs. The ADC may then relay the service requests to a backend server over a physical or logical network, namely over a server pool or a virtual machine pool.

Referring now to the drawings, FIG. 1 illustrates an environment 100 within which a method and a system for load distribution in an SDN can be implemented. The environment 100 may include a network 110, a client 120, a system 300 for load distribution, and servers 140. The client 120 may include a user or a host associated with the network 110.

The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may include a network of data processing nodes that are interconnected for the purpose of data communication. The network 110 may include an SDN. The SDN may include one or more of the above network types. Generally the network 110 may include a number of similar or dissimilar devices connected together by a transport medium enabling communication between the devices by using a predefined protocol. Those skilled in the art will recognize that the present disclosure may be practiced within a variety of network configuration environments and on a variety of computing devices.

As shown in FIG. 1, the client 120 may send service requests 150 to servers 140, which may be backend servers. The service requests 150 may include an HTTP request, a video streaming request, a file download request, a transaction request, a conference request, and so forth. The servers 140 may include a web server, a wireless application server, an interactive television server, and so forth. The system 300 for load distribution may balance flow of the service requests 150 among traffic forwarding devices of the network 110. The system 300 for load distribution may analyze the flow of the service requests 150 and determine which and how many traffic forwarding devices of the network 110 are needed to deliver the service requests 150 to the servers 140.

Figure 2:
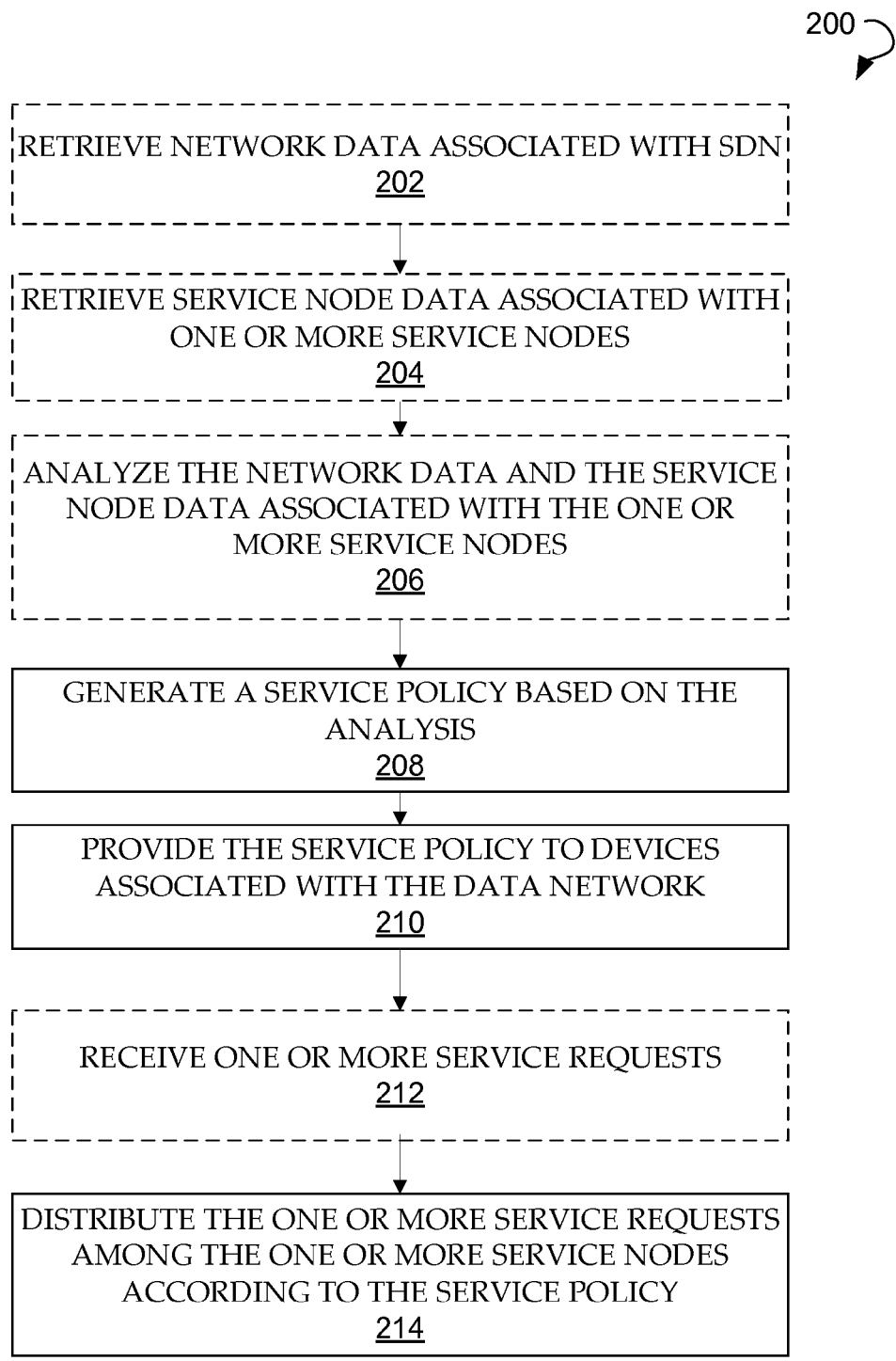
FIG. 2 is a process flow diagram showing a method for service load distribution in a data network, according to an example embodiment.

FIG. 2 is a process flow diagram showing a method 200 for service load distribution in an SDN, according to an example embodiment. The method 200 may be performed by processing logic that may comprise hardware (e.g., decision making logic, dedicated logic, programmable logic, and microcode), software (such as software running on a general-purpose computer system or a dedicated machine), or a combination of both.

The method 200 may commence with receiving network data associated with the SDN at operation 202. In an example embodiment, the network data associated with the SDN may be indicative of the health of the SDN, processing unit utilization, number of total connections, memory status, network connectivity, backend server capacity, and so forth. At operation 204, the method may comprise retrieving service node data associated with one or more service nodes. In an example embodiment, the one or more service nodes may include a virtual machine and a physical device. The service node data may be indicative of health of the node, dynamic state, node processing unit utilization, node memory status, network connectivity of the service nodes, responsiveness of the one or more service nodes, and so forth.

At operation 206, the retrieved network data and service node data may be analyzed. Based on the analysis, a service policy may be generated at operation 208. The service policy may include one or more of the following: a service address, a service node address, a traffic distribution policy, a service node load policy, and so forth. The method may further comprise providing, i.e. pushing, the generated service policy to devices associated with the data network. The devices associated with the data network may include the service nodes and traffic classification engines.

The method 200 may continue with providing the generated service policy to the devices associated with the data network at operation 210. Upon receiving one or more service requests at operation 212, the one or more service requests may be distributed among the one or more service nodes according to the service policy at operation 214. In an example embodiment, the method 200 may comprise developing, based on the analysis, a further service policy. The further service policy may be associated with scaling out, scaling down, remedying, removing services associated with the one or more service nodes, introducing a new service associated with the one or more service nodes, and so forth.

In an example embodiment, the method 200 may comprise performing health checks of a backend server by the devices associated with the data network. In further example embodiments, the method 200 may comprise scaling up or scaling down service nodes, backend servers, traffic classification engines, and cluster masters in a graceful manner with minimum to no disruption to the traffic flow. Furthermore, the services may be scaled up or scaled down in a graceful manner with minimum to no disruption to traffic flow. In the event of scaling up or scaling down of the service node, the service requests may be redirected to one or more other service nodes to continue processing data associated with the service request. In further example embodiments, the method 200 may comprise optimizing reverse traffic from backend servers to the service node handling the service.

Figure 3:
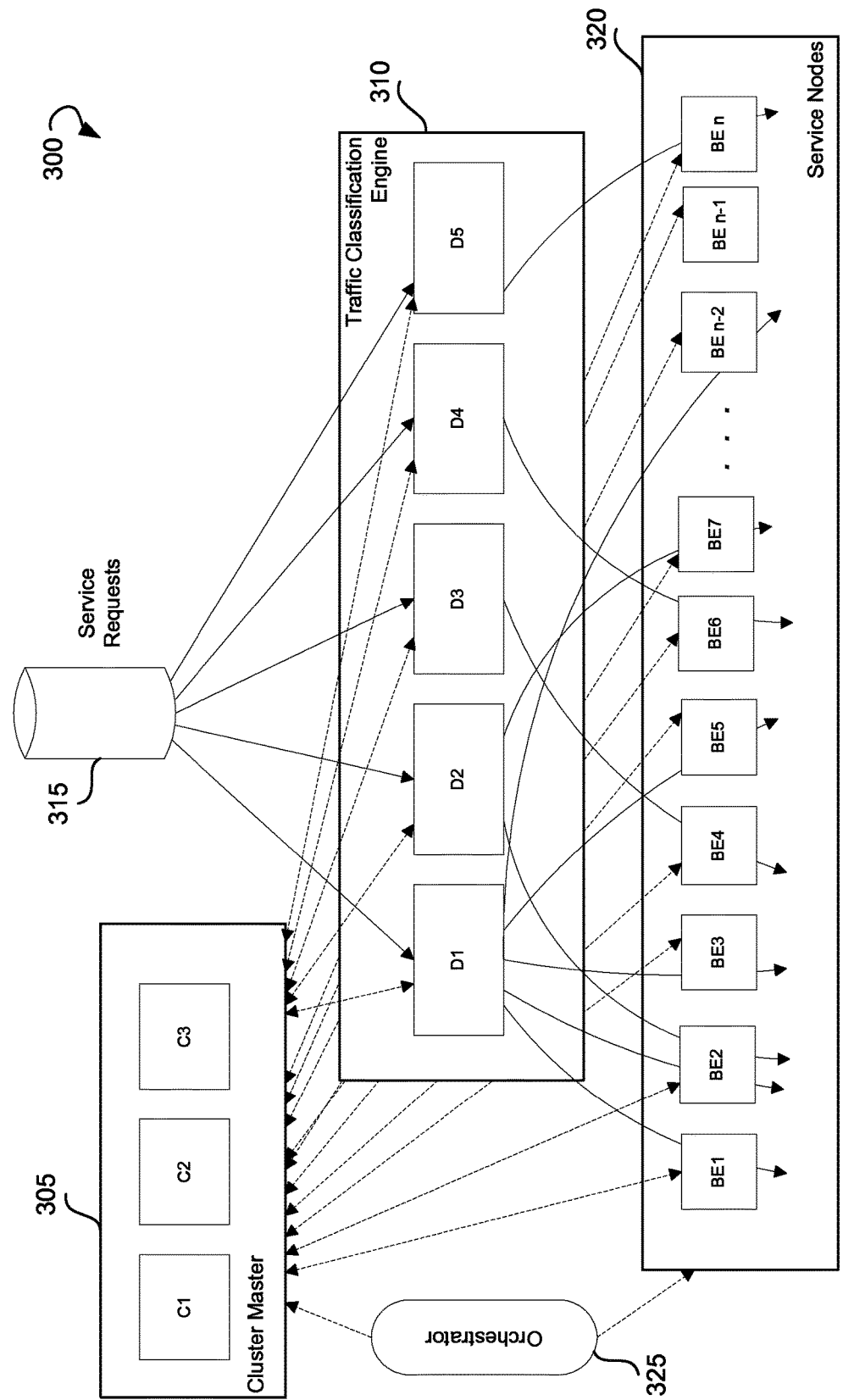
FIG. 3 is a block diagram showing various modules of a system for service load distribution in a data network, according to an example embodiment.

FIG. 3 shows a block diagram illustrating various modules of an exemplary system 300 for service load distribution in an SDN. The system 300 may comprise a cluster of devices eligible as a cluster master. The system 300 may comprise a cluster master 305 elected from these devices. The cluster master 305 may be configured to keep track of the SDN and retrieve network data associated with the SDN. In an example embodiment, the network data may include one or more of the following: a number of total connections, processing unit utilization, a memory status, a network connectivity, backend server capacity, and so forth. Furthermore, the cluster master 305 may be configured to keep track of the service nodes and retrieve service node data associated with one or more service nodes. The service node data may include one or more of the following: health, dynamic state, responsiveness of the one or more service nodes, and so forth. In other words, the cluster master 305 may keep track of the health of the network and each service node associated with the system 300. The cluster master 305 may analyze the retrieved network data and service node data. Based on the analysis, the cluster master 305 may generate a service policy. The service policy may include a service address, a service node address, a service node load policy, a traffic distribution policy also referred to as a traffic mapping, and so forth. The cluster master 305 may provide the generated service policy to the devices associated with the data network, such as service nodes and traffic classification engines.

In an example embodiment, the cluster master 305 may be further configured to develop, based on the analysis, a further service policy. The further policy may be associated with scaling out, scaling down, remedying, removing devices, such as service nodes, traffic classification engines, backend servers and so forth, introducing new service nodes, traffic classification engines, backend servers, and so forth.

In an example embodiment, the cluster master 305 may be further configured to facilitate an application programmable interface (not shown) for a network administrator to enable the network administrator to develop, based on the analysis, a further service policy using the retrieved network data and service node data and analytics. This approach may allow application developers to write directly to the network without having to manage or understand all the underlying complexities and subsystems that compose the network.

In a further example embodiment, the cluster master 305 may include a backup unit (not shown) configured to replace the cluster master in case of a failure of the cluster master 305.

The system 300 may comprise a traffic classification engine 310. The traffic classification engine 310 may be implemented as one or more software modules, hardware modules, or a combination of hardware and software. The traffic classification engine 310 may include an engine configured to monitor data flows and classify the data flows based on one or more attributes associated with the data flows, e.g. uniform resource locators (URLs), IP addresses, port numbers, and so forth. Each resulting data flow class can be specifically designed to implement a certain service for a client. In an example embodiment, the cluster master 305 may send a service policy to the traffic classification engine 310. The traffic classification engine 310 may be configured to receive the service policy from the cluster master 305. Furthermore, the traffic classification engine 310 may be configured to receive one or more incoming service requests 315, e.g. incoming data traffic from routers or switches (not shown). Typically, the data traffic may be distributed from the routers or switches to each of the traffic classification engines 310 evenly. In an example embodiment, a router may perform a simple equal-cost multi-path (ECMP) routing to distribute the traffic equally to all the traffic classification engines 310. The traffic classification engines 310 may distribute the one or more service requests among one or more service nodes 320 according to the service policy. The traffic may be distributed to the one or more service nodes 320 in an asymmetric fashion. The traffic to the service nodes 320 may be direct or through a tunnel (IP-in-IP or other overlay techniques). The traffic classification engine 310 may be stateless or stateful, may act on a per packet basis, and direct each packet of the traffic to the corresponding service node 320. When there is a change in the service nodes state, the cluster master 305 may send a new service policy, such as a new traffic map, to the traffic classification engine 310.

The system 300 may comprise the one or more service nodes 320. The one or more service nodes 320 may include a virtual machine or a physical device that may serve a corresponding virtual service to which the traffic is directed. The cluster master 305 may send the service policy to the service nodes 320. The service nodes 320 may be configured to receive the service policy from the cluster master 305. Furthermore, the service nodes 320 may receive, based on the service policy, the one or more service requests 315 from the traffic classification engine 310. The one or more service nodes 320 may process the received one or more service requests 315 according to the service policy. The processing of the one or more service requests 315 may include forwarding the one or more service requests 315 to one or more backend destination servers (not shown). Each service node 320 may serve one or more virtual services. The service nodes 320 may be configured to send the service node data to the cluster master 305.

According to further example embodiment, an existing service node may redirect packets for existing flows to another service node if it is the new owner of the flow based on the redistribution of flows to the service nodes. In addition, a service node taking over the flow may redirect packets to the service node that was the old owner for the flows under consideration, for cases where the flow state needs to be pinned down to the old owner to maintain continuity of service.

Furthermore, in an example embodiment, the cluster master 305 may perform a periodic health check on the service nodes 320 and update the service nodes 320 with a service policy, such as a traffic map. When there is a change in the traffic assignment and a packet of the data traffic in a flow reaches a service node 320, the service node 320 may redirect the packet to another service node. Redirection may be direct or through a tunnel (e.g. IP-in-IP or other overlay techniques).

It should be noted that if each of the devices of the cluster in the network performs the backend server health check, it may lead to a large number of health check packets sent to an individual device. In view of this, the backend server health check may be performed by a few devices of the cluster and the result may be shared among the rest of the devices in the cluster. The health check may include a service check and a connectivity check. The service check may include determining whether the application or the backend server is still available. As already mentioned above, not every device in the cluster needs to perform this check. The check may be performed by a few devices and the result propagated to the rest of the devices in the cluster. A connectivity check includes determining whether the service node can reach the backend server. The path to the backend server may be specific to the service node, so this may not be distributed across service nodes, and each device in the cluster may perform its own check.

In an example embodiment, the system 300 may comprise an orchestrator 325. The orchestrator 325 may be configured to bring up and bring down the service nodes 320, the traffic classification engines 310, and backend servers. The orchestrator 325 may detect presence of the one or more service nodes 320 and transmit data associated with the presence of the one or more service nodes 320 to the cluster master 305. Furthermore, the orchestrator 325 may inform the cluster master 305 of bringing up or bringing down the service nodes 320. The orchestrator 325 may communicate with the cluster master 305 and the service nodes 320 using one or more Application Programming Interfaces (APIs).

In an example embodiment, a centralized or distributed network database may be used and shared among all devices in the cluster of the system 300, such as the cluster master, the traffic classification engine, and other service nodes. Each device may connect to the network database and update tables according to its role. Relevant database records may be replicated to the devices that are part of the cluster. The distributed network database may be used to store configurations and states of the devices, e.g. to store data associated with the cluster master, the traffic classification engine, the one or more service nodes, backend servers, and service policy data. The data stored in the distributed network database may include the network data and the service node data. The distributed network database may include tables with information concerning service types, availability of resources, traffic classification, network maps, and so forth. The cluster master 305 may be responsible for maintaining the distributed network database and replicating it to devices. The network database may be replicated to the traffic classification engines 310 and the service nodes 320. In an example embodiment, the network database may internally replicate data across the participant nodes.

In the embodiments described above, the system 300 may comprise a dedicated cluster master 305, dedicated traffic classification engines 310, and dedicated service nodes 320. In other words, specific devices may be responsible for acting as the cluster master, the traffic classification engine, and the service node. In further example embodiments, the system 300 may include no dedicated devices acting as a cluster master. In this case, the cluster master functionality may be provided by either the traffic classification engines or by the service nodes. Thus, one of the traffic classification engines or one of the service nodes may act as the cluster master. In case the traffic classification engine or service node acting as the cluster master fails, another traffic classification engine or service node may be elected as the cluster master. The traffic classification engines and the service nodes not elected as the cluster master may be configured as backup cluster masters and synchronized with the current cluster master. In an example embodiment, the cluster master may consist of multiple active devices which can act as a single master by sharing duties among the devices.

In further example embodiments, the system 300 may comprise a dedicated cluster master with no dedicated devices acting as traffic classification engines. In this case, the traffic classification may be performed by one of upstream routers or switches. Also, the service nodes may distribute the traffic among themselves. In an example embodiment, the cluster master and the service nodes may be configured to act as a traffic classification engine.

In further example embodiments, the system 300 may include no devices acting as cluster masters and traffic classification engines. In this case, one of the service nodes may also act as the cluster master. The traffic classification may be done by upstream routers or switches. The cluster master may program the upstream routers with the traffic mapping. Additionally, the service nodes may distribute the traffic among themselves.

It should be noted that bringing up new service nodes when the load increases and bringing down the service nodes when the load becomes normal may be performed gracefully, without affecting existing data traffic and connections. When the service node comes up, the distribution of traffic may change from distribution to n service nodes to distribution to (n+1) service nodes.

When a service node is about to be brought down, the traffic coming to this service node may be redirected to other service nodes. For this purpose, a redirection policy associated with the service node about to be brought down may be created by the cluster master and sent to the traffic distribution engine and/or the service nodes. Upon receiving the redirection policy, the traffic distribution engine may direct the traffic to another service node.

In an example embodiment, the system 300 may comprise, for example, a plurality of traffic distribution engines, each of which may serve traffic to multiple services. Each of the traffic distribution engines may communicate with a different set of service nodes. In case one of the traffic distribution engines fails, another traffic distribution engines may be configured to substitute the failed traffic distribution engine and to distribute the traffic of the failed traffic distribution engines to the corresponding service nodes.

Therefore, each of the traffic distribution engines may comprise addresses of all service nodes and not only addresses associated with the service nodes currently in communication with the traffic distribution engine.

Figure 4:
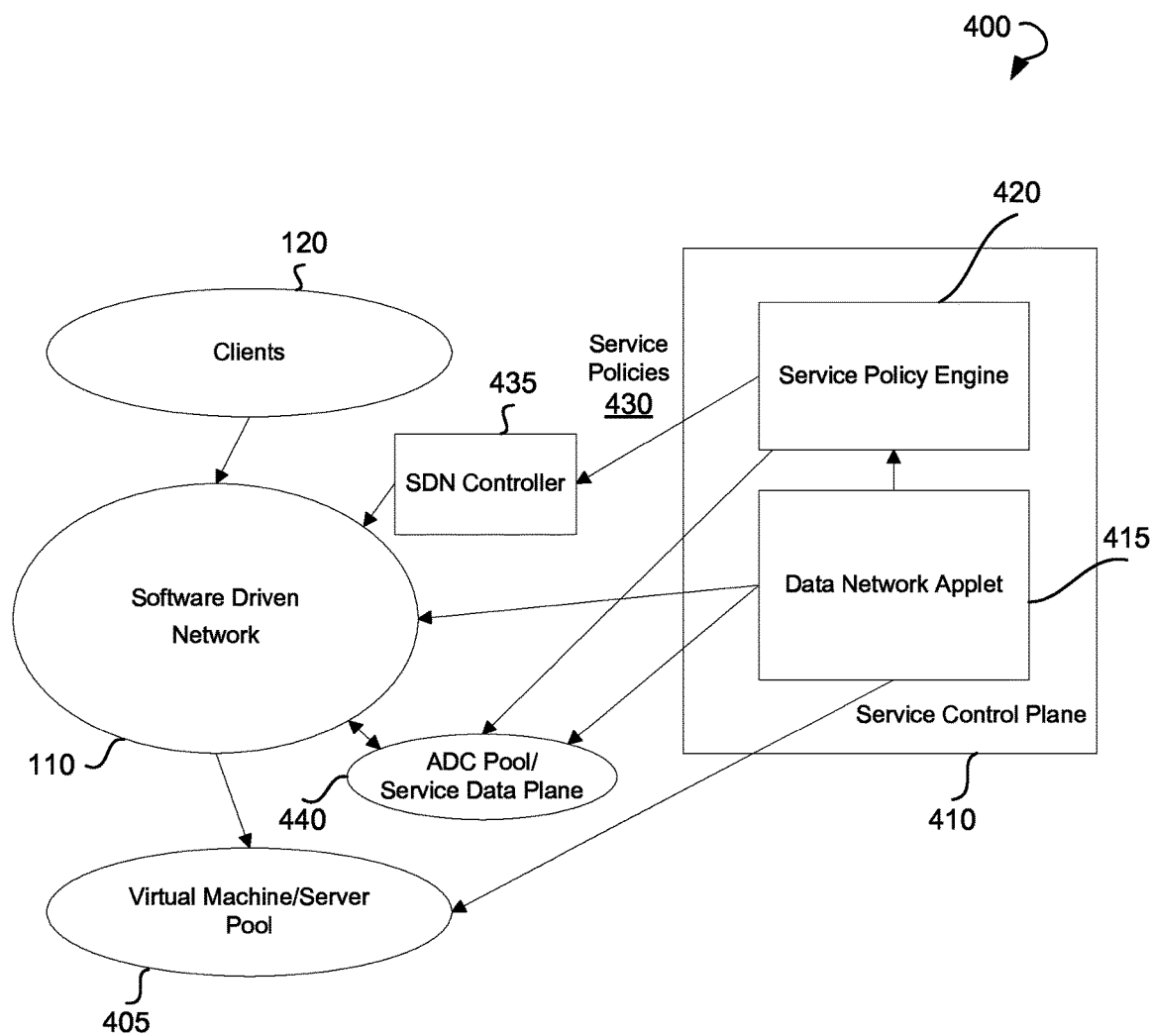
FIG. 4 is a scheme for service load distribution of a data network, according to an example embodiment.

FIG. 4 shows a diagram 400 for load distribution of an SDN. As shown, diagram 400 includes client 120, e.g., a computer connected to a network 110. The network 110 may include the SDN. The client 120 may send one or more service requests for services provided by one or more servers of the virtual machine/server pool 405 (also referred to herein as virtual machine/physical server pool 405). These servers may include web servers, wireless application servers, interactive television servers, and so forth. These service requests can be load balanced by a system for load distribution described above. In other words, the service requests of the client 120 may be intelligently distributed among virtual machine/ physical server pool 405 of the SDN.

The system for load distribution may include a service control plane 410. The service control plane 410 may include one or more data network applets 415, for example, a real time data network applet. The data network applets 415 may check the health and other data associated with the SDN and the virtual machines in the virtual machine/server pool 405. For example, the data network applets 415 may determine responsiveness of the virtual machines in the virtual machine/server pool 405. Furthermore, the data network applets 415 may monitor the total connections, central processing unit utilization, memory, network connectivity on the virtual machines in the virtual machine/server pool 405, and so forth. Therefore, the data network applets 415 may retrieve fine-grained, comprehensive information concerning the SDN and virtual machine service infrastructure.

The retrieved health data may be transmitted to a service policy engine 420. In example embodiments, a cluster master 305 described above may act as the service policy engine 420. The service policy engine 420 may analyze the health data and, upon the analysis, generate a set of service policies 430 to scale up/down the services, to secure services, to introduce new services, to remove services, to remedy or repair failed devices, and so forth. The system for load distribution may further comprise an orchestrator (not shown) configured to bring up more virtual machines on demand. Therefore, in order to deliver a smooth client experience, the service requests may be load balanced across the virtual machines in the virtual machine/server pool 405.

Furthermore, the service policies 430 may be provided to an SDN controller 435. The SDN controller 435, in turn, may steer service requests, i.e. data traffic, across the network devices in the SDN. Effectively, these policies may influence load balancing, high availability as well as programming the SDN network to scale up or scale down services.

Generally speaking, by unlocking the data associated with the network, service nodes and the server/virtual machines from inside the network, transforming the data into relevant information and the service policies 430, and then presenting the service policies 430 to the SDN controller 435 for configuring the SDN 110, the described infrastructure may enable feedback loops between underlying infrastructure and applications to improve network optimization and application responsiveness.

The service control plane 410 working in conjunction with the SDN controller 435 and the service policy engine 420 may create a number of deployment possibilities, which may offer an array of basic and advanced load distribution features. In particular, to provide a simple load balancing functionality, the SDN controller 435 and the service control plane 410 may provide some load balancing of their own by leveraging the capabilities of the SDN 110 or, alternatively, work in conjunction with an ADC 440, also referred to as a service data plane included in the SDN 110 to optionally provide advanced additional functionality.

In an example embodiment, when the service control plane 410 may be standalone, i.e. without an ADC 440, virtual machines in the virtual machine/server pool 405, when scaled up, may be programmed with a virtual Internet Protocol (VIP) address on a loopback interface of the virtual machines in the virtual machine/server pool 405. Thus, for data traffic in need of simple service fulfillment, the service control plane 410 may establish simple policies for distributing service requests and instruct the SDN controller 435 to program network devices to distribute the service requests directly to different virtual machines/physical servers in the virtual machine/server pool 405. This step may be performed over a physical or logical network.

In an example embodiment, when the service control plane 410 may work in cooperation with an ADC 440, for more sophisticated ADC functionality typically offered by a purpose built ADC device, the service control plane 410 may manage a set of service policy mapping service requests to one or more ADC devices. The service control plane 410 may instruct the SDN controller 435 to program network devices such that the service requests, i.e. the traffic, may reach one or more ADCs 440. The ADC 440 then may relay the service request to a backend server over a physical or logical network.

In the described embodiment several traffic flow scenarios may exist. In an example embodiment, only forward traffic may go through the ADC 440. If a simple functionality of the ADC 440, e.g. rate limiting, bandwidth limiting, scripting policies, is required, the forward traffic may traverse the ADC 440. The loopback interface on the servers may be programmed with the VIP address. Response traffic from the virtual machines in the virtual machine/server pool 405 may bypass the ADC 440.

In a further example embodiment, forward and reverse traffic may traverse the ADC 440. In the ADC 440 providing a more advanced functionality, e.g. transmission control protocol (TCP) flow optimization, secure sockets layer (SSL) decryption, compression, caching and so forth, is required, the service control plane 410 may need to ensure both the forward and reverse traffic traverses through the ADC 440 by appropriately programming the SDN 110.

Figure 5:
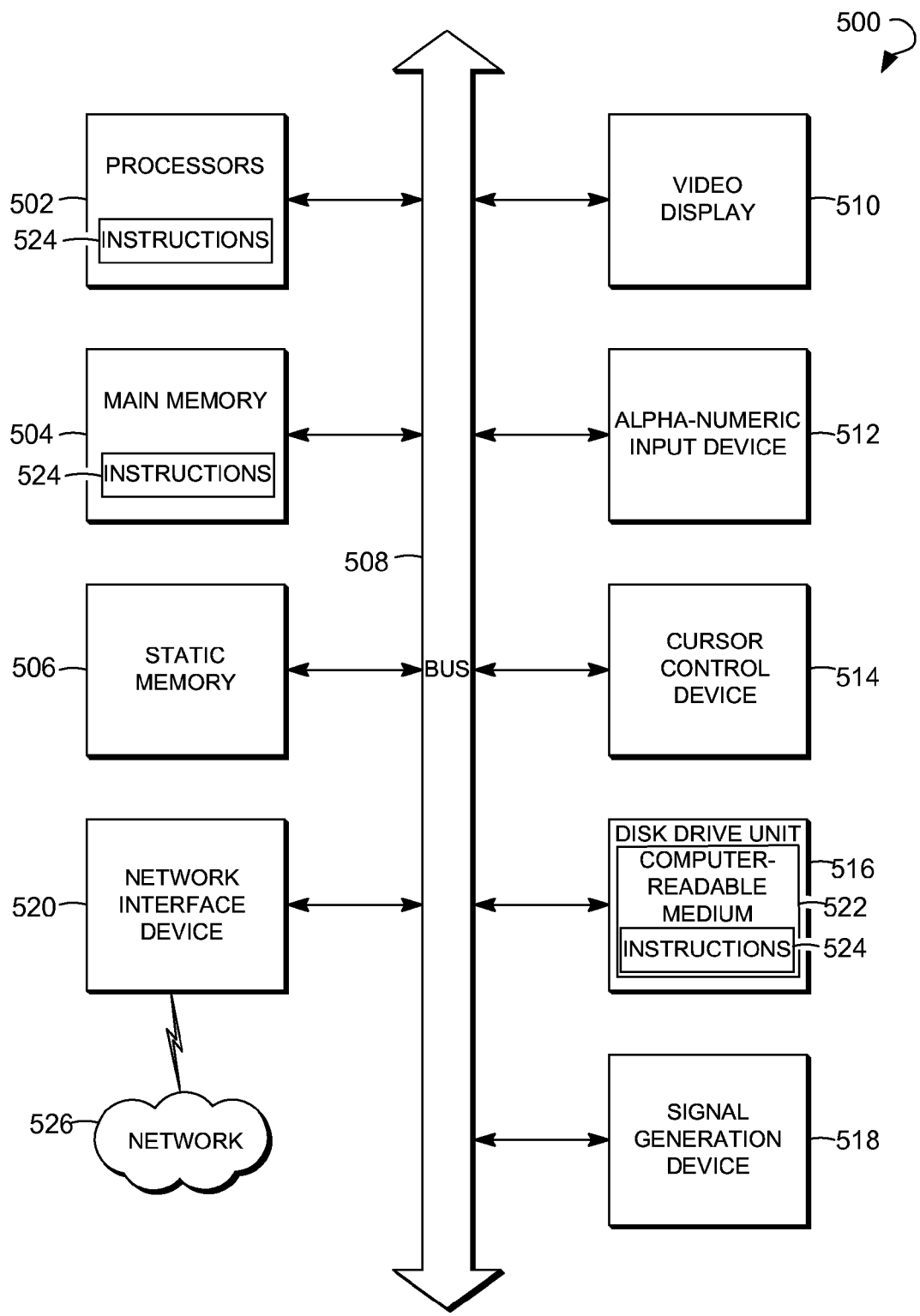
FIG. 5 shows a diagrammatic representation of a computing device for a machine in the example electronic form of a computer system, within which a set of instructions for causing the machine to perform any one or more of the methodologies discussed herein can be executed.

FIG. 5 shows a diagrammatic representation of a machine in the example electronic form of a computer system 500, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor or multiple processors 502 (e.g., a central processing unit (CPU), a graphics processing unit (GPU), or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 may also include an alphanumeric input device 512 (e.g., a keyboard), a cursor control device 514 (e.g., a mouse), a disk drive unit 516, a signal generation device 518 (e.g., a speaker), and a network interface device 520.

The disk drive unit 516 includes a non-transitory computer-readable medium 522, on which is stored one or more sets of instructions and data structures (e.g., instructions 524) embodying or utilized by any one or more of the methodologies or functions described herein. The instructions 524 may also reside, completely or at least partially, within the main memory 504 and/or within the processors 502 during execution thereof by the computer system 500. The main memory 504 and the processors 502 may also constitute machine-readable media.

The instructions 524 may further be transmitted or received over a network 526 via the network interface device 520 utilizing any one of a number of well-known transfer protocols (e.g., Hyper Text Transfer Protocol (HTTP)).

While the computer-readable medium 522 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for load distribution in an SDN are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for service load distribution in a data network, the method comprising:
generating a service policy for distributing network service requests among a plurality of load balancing devices in the data network, wherein the plurality of load balancing devices includes a plurality of routers, a plurality of traffic classification engines, and a plurality of service nodes;
providing the service policy to the plurality of load balancing devices associated with the data network;
receiving, by the plurality of routers, one or more service requests;
distributing, by the plurality of routers, the one or more service requests evenly to one or more of the plurality of traffic classification engines;
distributing, by the one or more of the plurality of traffic classification engines, the one or more service requests asymmetrically to one or more of the plurality of service nodes according to the service policy; and
distributing, by the one or more of the plurality of service nodes, the one or more service requests to one or more backend servers according to the service policy, wherein the service policy is generated based on at least a responsiveness of each of the plurality of service nodes and reachability of the one or more backend servers to the one or more of the plurality of service nodes.

2. The method of claim 1, further comprising:
retrieving network data associated with the data network;
retrieving service node data associated with one or more service nodes; and
analyzing the network data and the service node data, wherein the service policy is generated based on the analysis of the network data and the service node data.

3. The method of claim 2, further comprising pushing the service policy to the plurality of load balancing devices associated with the data network.

4. The method of claim 2, wherein the network data includes at least one of health of a service node, a number of total connections, processing unit utilization, a memory status, backend server capacity, and network connectivity.

5. The method of claim 2, wherein the service node data includes at least one of a dynamic state, node processing unit utilization, a node memory status, and the responsiveness of each of the plurality of service nodes.

6. The method of claim 2, further comprising developing a further service policy based on the analysis, wherein the further service policy is associated with scaling up, scaling down, remedying, removing or introducing one or more new service nodes, traffic classification engines or backend servers.

7. The method of claim 6, wherein when a service node of the plurality of service nodes is scaled up or scaled down, the one or more service requests are redirected to the one or more the plurality of service nodes to continue processing data associated with the one or more service requests.

8. The method of claim 2, wherein the plurality of service nodes includes a virtual machine and a physical device.

9. The method of claim 2, further comprising facilitating reverse traffic from the backend servers to the one or more of the plurality of service nodes.

10. The method of claim 1, wherein the data network includes a software driven network (SDN), the SDN comprising at least one of the plurality of traffic classification engines, the plurality of service nodes, and application delivery controllers.

11. The method of claim 1, wherein the service policy includes at least one of a traffic distribution policy and a service node load policy.

12. The method of claim 1, further comprising:
facilitating an application programmable interface to a network administrator; and
developing a further service policy based on the analysis, the further service policy being for the network administrator via the application programmable interface.

13. The method of claim 1, further comprising performing a health check of the one or more backend servers by the plurality of load balancing devices associated with the data network.

14. The method of claim 1, further comprising scaling up the plurality of service nodes, the one or more backend servers, the plurality of traffic classification engines, cluster masters, and other devices in the SDN network while reducing disruption to traffic flow.

15. The method of claim 1, further comprising scaling down the plurality of service nodes, the one or more backend servers, the plurality of traffic classification engines, cluster masters, and other devices in the SDN network while reducing disruption to traffic flow.

16. The method of claim 1, further comprising scaling up or scaling down services while reducing disruption to traffic flow.

17. The method of claim 1, further comprising:
detecting the one or more of the plurality of service nodes; and
transmitting data associated with the one or more of the plurality of service nodes to the cluster master.

18. The method of claim 1, further comprising:
storing data associated with at least one of the cluster master, the plurality of traffic classification engines, the plurality of service nodes, the one or more backend servers, and service policies; and
sharing the data among the cluster master, the plurality of traffic classification engines, and the plurality of service nodes.

19. A system for service load distribution in a data network, the system comprising:
a cluster master that:
retrieves network data associated with the data network;
retrieves service node data associated with one or more service nodes;
analyzes the network data and the service node data;
based on the analysis, generates a service policy for distributing network service requests among a plurality of load balancing devices in the data network, wherein the plurality of load balancing devices includes a plurality of routers, a plurality of traffic classification engines, and a plurality of service nodes; and
provides the service policy to the plurality of load balancing devices associated with the data network;
the plurality of routers that:
receive one or more service requests; and
distribute the one or more service requests evenly to one or more of the plurality of traffic classification engines;
the plurality of traffic classification engines, wherein at least the one or more of the plurality of traffic classification engines are configured to:
receive the service policy;
receive the one or more service requests from the plurality of routers; and
distribute the one or more service requests asymmetrically to one or more of the plurality of service nodes according to the service policy; and
the plurality of service nodes, wherein at least the one or more of the plurality of service nodes are configured to distribute the one or more service requests to one or more backend servers according to the service policy;
wherein the service policy is generated based on at least a responsiveness of each of the plurality of service nodes and reachability of the one or more backend servers to the one or more of the plurality of service nodes.

20. The system of claim 19, wherein the plurality of service nodes and plurality of the traffic classification engines acts as a cluster master, and wherein the cluster master and the plurality of service nodes act as a traffic classification engine.

21. The system of claim 19, further comprising an orchestrator that:
detects the one or more of the plurality of service nodes; and
transmits data associated with the one or more of the plurality of service nodes to the cluster master.

22. The system of claim 19, further comprising a network database that:
stores data associated with at least one of the cluster master, the plurality of traffic classification engines, the plurality of service nodes, the one or more backend servers, and service policies; and
allows the data to be shared among the cluster master, the plurality of traffic classification engine, and the plurality of service nodes.

23. The system of claim 22, wherein the stored data includes the network data and the service node data.

24. The system of claim 19, wherein each of the plurality of service nodes is further configured to send the service node data to the cluster master.

25. The system of claim 19, wherein the network data includes at least one of a number of total connections, processing unit utilization, a memory status, and network connectivity.

26. The system of claim 19, wherein the service node data includes at least one of a health of the service node, a dynamic state, and the responsiveness of each of the plurality of service nodes.

27. The system of claim 19, wherein the service policy includes at least one of service address, service node address, a traffic distribution policy, and a service node load policy.

28. The system of claim 19, wherein the cluster master includes a backup unit configured to replace the cluster master in case of a failure of the cluster master.

29. The system of claim 19, wherein the cluster master performs at least one of:

developing a further service policy based on the analysis, wherein the further service policy is associated with scaling down, scaling up, remedying, removing services associated with the plurality of service nodes, or introducing a new service associated with the plurality of service nodes; and facilitating provision of an application programmable interface to a network administrator to enable the network administrator to develop, based on the analysis, a further service policy.

30. The method of claim 29, wherein when services associated with a service node of the plurality of service nodes are scaled up or scaled down, the one or more service requests are redirected to the one or more of the plurality of service nodes to continue processing data associated with the one or more service requests.

31. The system of claim 19, further comprising performing a health check of the one or more backend servers by the plurality of load balancing devices associated with the data network.

32. The system of claim 19, further comprising scaling up the plurality of service nodes, the one or more backend servers, the plurality of traffic classification engines, cluster masters, and other devices in the SDN network while reducing disruption to the traffic flow.

33. The system of claim 19, further comprising scaling down the plurality of service nodes, the one or more backend servers, the plurality of traffic classification engines, cluster masters, and other devices in the SDN network while reducing disruption to traffic flow.

34. The system of claim 19, further comprising scaling up and scaling down services while reducing disruption to traffic flow.

35. The method of claim 19, further comprising facilitating reverse traffic from the one or more backend servers to the one or more of the plurality of service nodes.

36. A non-transitory processor-readable medium having instructions stored thereon, which when executed by one or more processors, cause the one or more processors to perform the following operations:

retrieving network data associated with a data network;

retrieving service node data associated with a plurality of service nodes;

analyzing the network data and the service node data;

based on the analyzed network data and service node data, generating a service policy for distributing network service requests among a plurality of load balancing devices in the data network, wherein the plurality of load balancing devices includes a plurality of routers, a plurality of traffic classification engines, and the plurality of service nodes;

providing the service policy to plurality of load balancing devices associated with the data network;

receiving, by the plurality of routers, one or more service requests;

distributing, by the plurality of routers, the one or more service requests evenly to one or more of the plurality of traffic classification engines;

distributing, by the one or more of the plurality of traffic classification engines, the one or more service requests asymmetrically to one or more of the plurality of service nodes according to the service policy;

distributing, by the one or more of the plurality of service nodes, the one or more service requests to one or more backend servers according to the service policy, wherein the service policy is generated based on at least a responsiveness of each of the plurality of service nodes and reachability of the one or more backend servers to the one or more of the plurality of service nodes;

developing a first further service policy based on the analysis, wherein the first further service policy is associated with scaling up, scaling down, remedying, or removing services associated with the plurality of service nodes, and introducing a new service associated with the plurality of service nodes;

facilitating providing an application programmable interface to a network administrator;

developing a second further service policy based on the analysis by the network administrator via the application programmable interface;

performing a health check of the one or more backend servers by the plurality of load balancing devices associated with the data network;

scaling up or scaling down at least one of the plurality of service nodes, the one or more backend servers, the plurality of traffic classification engines, and cluster masters while reducing disruption to traffic flow;

scaling up or scaling down services while reducing disruption to the traffic flow;

facilitating reverse traffic from the one or more backend servers to the one or more of the plurality of service nodes; and redirecting the one or more service requests to the one or more of the plurality of service nodes to continue processing data associated with the one or more service requests when at least one service node of the plurality of service nodes has been scaled up or down.

* * * * *